March 10, 1925. 1,529,296
B. H. BLOOD
GAUGE
Filed Jan. 26, 1921
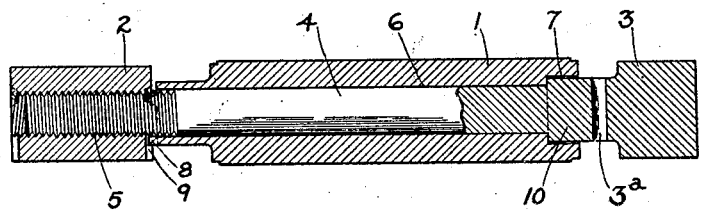
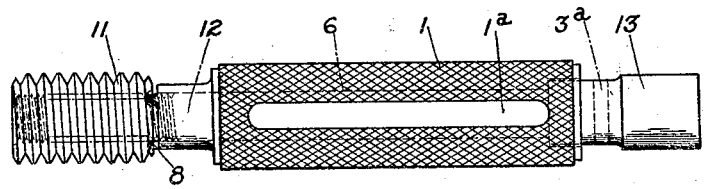
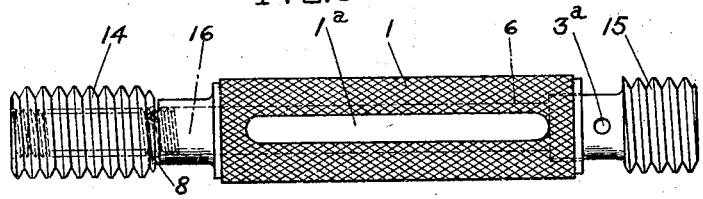
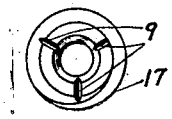
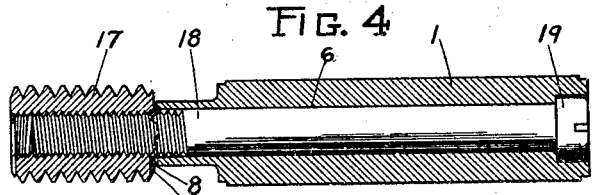
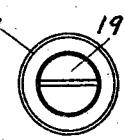
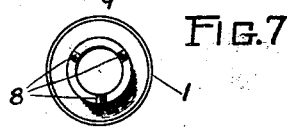
Inventor
B. H. Blood
By Joseph M. Schofield
Attorney Patented Mar. 10, 1925.

1,529,296

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

GAUGE.

Application filed January 26, 1921. Serial No. 440,089.

*To all whom it may concern:*

Be it known that I, BRYANT H. BLOOD, a citizen of the United States, residing at Hartford, in the county of Hartford and State of Connecticut, have invented certain new and useful Improvements in Gauges, of which the following is a specification.

This invention relates to gauges and particularly to plug gauges of both the single and double end type, and the primary object of the invention is to provide a gauge combination adapted to be readily assembled to form a gauge of either of the above types.

It is an object of the invention to provide a plug gauge combination comprising a handle and means for readily mounting a desired single gauging head on one end only thereof or for mounting gauging heads of the desired size and configuration on both ends thereof.

It is another object of the invention to provide an improved gauge handle adapted to be used in combination with a plug gauge either of the single or double end type.

With the above and other objects in view as will appear as the description proceeds, the invention will now be described by reference to the drawing wherein:

Figure 1 is a longitudinal sectional view through a "go" and "not go" plug gauge showing one combination of gauge comprising the present invention.

Fig. 2 is an elevation of a thread and plug gauge comprising another combination of the invention.

Fig. 3 is an elevation of a double end thread gauge comprising another combination of the invention.

Fig. 4 is a longitudinal sectional view through a single end gauge comprising another combination of the invention.

Fig. 5 is a front end view of the gauge shown in Fig. 4.

Fig. 6 is a rear end view of the gauge shown in Fig. 4.

Fig. 7 is a front end view of the gauge handle shown in Fig. 4.

Interchangeability of parts whereby may be produced different combinations for performing certain desired functions is of great advantage in many arts and such a relation of parts in the art of measuring instruments of the type defined herein is of particular advantage. The present invention provides for such interchanging of parts in a plug gauge whereby any desired combination, either of the single or double end type gauge, may be produced. The term "plug gauge" as used herein includes a gauge having either a plane or threaded gauging surface. The invention comprises, briefly, a gauge handle and means for securing a gauging head or heads to the handle in any combination desired.

In Fig. 1 is illustrated a "go" and "not go" plug gauge combination, comprising a gauge handle 1, gauging heads 2 and 3 and securing means therefor comprising a bolt 4. The "go" head 2 is secured to the handle by the screw-threaded portion 5 of the bolt 4, and the "not go" head is preferably integral with the opposite end of the bolt and serves also as an operating head for the bolt, a hole 3$^a$ being provided for receiving an instrument for turning the bolt. The handle in addition to being provided with the central longitudinal opening 6 for receiving the bolt is also provided with means at one end for preventing rotation of the gauging head on the handle and with a countersink 7 at the opposite end thereof. The means for preventing the rotation of the head on the handle comprises a plurality of projections and recesses preferably on the handle and head respectively. The handle end (Fig. 7) as illustrated is provided with three projections 8 and the "go" gauging heads with three corresponding recesses 9 in the ends thereof. The gaging head is thereby held secured with a tripod support on the handle end in a manner to prevent any rotation or looseness thereon. A reduced portion 10 of the gauging head 3 is adapted to seat in the countersink 7.

The gauge illustrated in Fig. 2 is like that shown in Fig. 1 except that a threaded gauging head 11 and a bolt 12 having a gauging head 13 of the desired size have been substituted for such elements shown in Fig. 1. In this type of gauge, the heads 11 and 13 are adapted respectively to measure the root and apex diameters of a threaded opening. The gauge handle 1 is the same in all the combinations illustrated in the drawing. Each handle is preferably provided with a plane surface 1ª for stamping any desired marking on the gauge.

In Fig. 3 is illustrated another combination comprising a "go" and "not go" threaded plug gauge. 14 indicates the "go" head and 15 the "not go" head. The "go" head 14 is secured to the handle in the manner already described in reference to Figs. 1 and 2, and the "not go" head 15 is preferably integral with the bolt 16 as illustrated.

In Figs. 4, 5 and 6 is illustrated a combination comprising a single end plug gauge. The gauging head 17 herein may be any of the heads 2, 11 and 14, illustrated above, or any similar head of the desired size and configuration. The handle 1 is the same as that heretofore described, a securing bolt 18 having a slotted head 19, however, being substituted for the bolts above described. The head 17 is prevented from rotation on the handle by means of the projections 9 and the head may be secured to or disengaged from the handle by rotating the bolt 18.

By means of the elements comprising the invention any desired combination in a plug gauge may be readily and easily produced. As above stated, the same handle 1 is adapted to be used in forming any of the combinations, and any of the "go" gaging heads are adapted to be non-rotatably mounted on the handle either in combination with any of the "not go" gauging heads to provide a double end plug gauge or by itself by means of the securing bolt 18 to provide a single end plug gauge. It is well known that most of the wear and strain in gauges of the type herein described is on the "go" gaging head, hence the provision herein for positively preventing rotation and looseness of this head on the handle. Other combinations not illustrated herein may be made up from the several elements when desired and any such combinations are considered as within the scope of the invention as defined by the appended claims.

What I claim is:

1. A gauge comprising a handle having a longitudinal opening centrally therethrough, a gaging head, means extending entirely through the said opening and engaging the head for securing the head to one end of the handle, means for preventing rotation of the head on the handle, and means at the other end of the handle for operating the said first means to secure and release the head relative to the handle.

2. A gauge comprising a handle having a longitudinal opening centrally therethrough, a gaging head, a volt extending through the said opening and threadedly engaging the head for securing the head to the handle, and means comprising inter-engaging projections and recesses on the relatively adjacent ends of the handle and head for preventing rotation of the head on the handle.

3. A gauge comprising a handle having an opening extending longitudinally therethrough, a gauging head, a bolt extending through the said opening and threadedly engaging the head for securing the head to the handle, and means comprising three inter-engaging projections and recesses on the relatively adjacent ends of the handle and head for preventing rotation of the head on the handle, the said three projections and recesses being adapted to form a tripod support for the head on the handle.

4. A gauge comprising a handle having a longitudinal opening centrally therethrough, two gaging heads, and means extending through the said opening, fitting the walls thereof and connected to the two heads to hold the same secured to the handle at the opposite ends thereof respectively.

5. A gauge comprising a handle having a longitudinal opening centrally therethrough, a gaging head, a bolt extending through the opening and engaging the said head for securing the head to one end of the handle, and a second gaging head mounted on the bolt at the opposite end of the handle.

6. A gauge comprising a handle having a longitudinal opening centrally therethrough, a gaging head, a bolt extending through the opening and threadedly engaging the said head for securing the head to one end of the handle, and a second gaging head integrally mounted on the bolt at the opposite end of the handle.

7. A gauge handle comprising a one-piece body portion having a bore extending centrally therethrough, the walls of the handle from the bore outwardly being relatively thick, and means at one end of the handle for preventing rotation of a gaging head on the handle, the said bore being adapted to receive an elongated member for securing the gaging head to the said end of the handle.

8. A gauge handle comprising a body portion having a bore extending centrally therethrough, the walls of the handle from the bore outwardly being relatively thick, and a V-shaped projection at one end of the handle for preventing rotation of a gaging head on the handle, the said bore being adapted to receive an elongated member for securing the gaging head to the said end of the handle.

9. A gauge handle comprising a body portion having a bore extending centrally therethrough, the walls of the handle from the bore outwardly being relatively thick, and three projections at one end of the handle for preventing rotation and looseness of a gaging head on the handle, the said bore being adapted to receive an elongated member for securing the gaging head to the said end of the handle.

10. A gauge handle comprising a body portion having a bore extending centrally therethrough and a countersink at one end thereof, and a projection at the other end of the handle for preventing rotation of a gaging head on the handle, the said bore being adapted to receive an elongated member for securing the gaging head to the last mentioned end of the handle.

In testimony whereof, I hereto affix my signature.

BRYANT H. BLOOD.